No. 662,692. Patented Nov. 27, 1900.
W. N. HARING.
TOBACCO PIPE.
(Application filed Aug. 23, 1900.)
(No Model.)
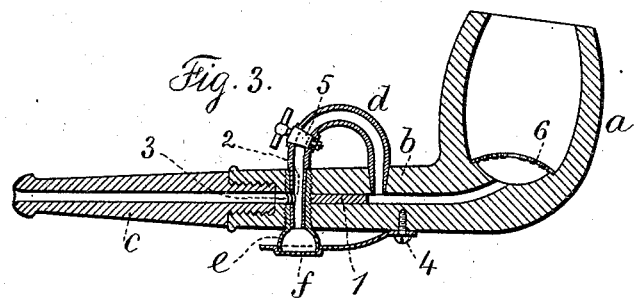
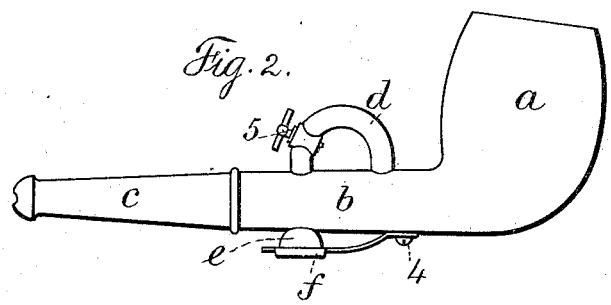
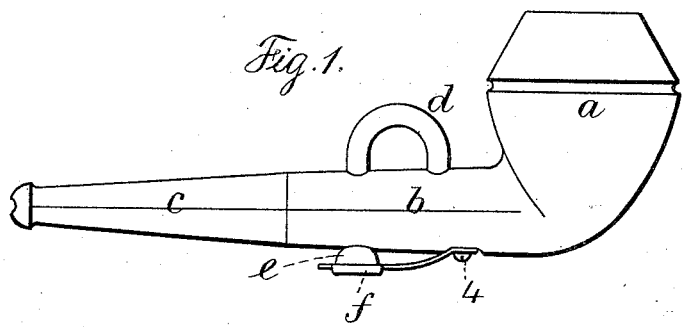
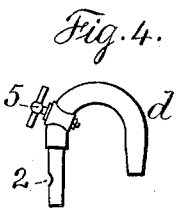 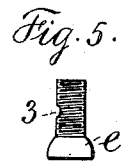 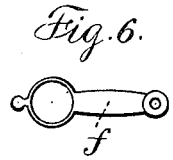
Witnesses:
J. Staib
Chas. H. Smith
Inventor:
William N. Haring
per L. W. Terrell & Son Attys.
THE NORRIS PETERS CO., PHOTO-LITHO., WASHINGTON, D. C.

UNITED STATES PATENT OFFICE.

WILLIAM N. HARING, OF NYACK, NEW YORK, ASSIGNOR TO HIMSELF AND ARTHUR MERRITT, OF SAME PLACE.

TOBACCO-PIPE.

SPECIFICATION forming part of Letters Patent No. 662,692, dated November 27, 1900.

Application filed August 23, 1900. Serial No. 27,761. (No model.)

*To all whom it may concern:*

Be it known that I, WILLIAM N. HARING, a citizen of the United States, residing at Nyack, in the county of Rockland and State of New York, have invented an Improvement in Tobacco-Pipes, of which the following is a specification.

The objects of my invention are to prevent the accumulation of poisonous nicotin and other matter in the parts of the pipe, to prevent the same reaching the smoker, and at the same time be able to readily cleanse the pipe.

In carrying out my invention and in combination with a pipe having a bowl, stem, and mouthpiece of ordinary construction, I provide an inverted removable U-shaped tube, which at one end passes into the stem of the pipe and forms a continuation of the opening therein and which at the other end passes through the stem of the pipe and into engagement with a tubular reservoir or trap closed at its lower outer end by a spring-cap. The tube and reservoir are provided with openings that agree with one another and with the orifice in the mouthpiece, so that from the opening in the bowl there is a continuous passage partly through the stem, through the inverted-U-shaped tube, and through the mouthpiece. This inverted-U-shaped tube may be made with a valve to close the same, if desired.

In the drawings, Figure 1 is an elevation representing my improvement. Fig. 2 is an elevation, and Fig. 3 a longitudinal section, illustrating the preferred form of the device. Figs. 4, 5, and 6 are detached views illustrating the parts of my improvement detached from the stem of the pipe.

The bowl $a$, stem $b$, and mouthpiece $c$ may be of ordinary construction and of any desired form. In the drawings I have shown the bowls as round, and in Figs. 2 and 3 the stem and mouthpiece are shown as round, while in Fig. 1 the stem and mouthpiece are shown of approximately lozenge shape in cross-section; but the shape is entirely immaterial.

The inverted-U-shaped tube $d$ rises above the stem of the pipe and the free end adjacent to the bowl is preferably slightly tapering and passes into the stem as far as the opening, and the other end of the tube is preferably reduced in area and passes through the stem, and the opening in the stem between the parts of the U-shaped tube is filled with a plug 1, and the reduced end of this tube $d$ is provided with a perforation 2, Fig. 4, representing an elevation of the inverted-U-shaped tube alone.

I provide a tubular reservoir or trap $e$. (Shown in elevation, Fig. 5, and in section, Fig. 3.) This is preferably exteriorly threaded and provided with a perforation 3, the lower end being of bell shape. This tubular reservoir or trap passes approximately through the stem $b$, screwing into the same, the perforation 3 coming in line with the orifice in the mouthpiece, and the reduced end of the inverted-U-shaped tube $d$ passes into this tubular reservoir or trap, the shoulder at the upper end of the reduced portion of said tube coming upon the upper end of the said tubular reservoir $e$ and the opening 2 in said reduced end alining with the opening 3 of the tubular reservoir, and it will be noticed by reference to Fig. 3 that there is a clear passage-way from the bowl of the pipe through part of the stem, through the inverted-U-shaped tube, through the openings 2 and 3 and the orifice in the mouthpiece, so that the smoker may draw unobstructedly upon the burning tobacco in the bowl.

I provide a spring-cap $f$, secured by a screw 4 to the under surface of the stem $b$, the spring-cap fitting over the lower bell-shaped end of the tubular reservoir $e$, so as to close off the same. In the operation of the pipe the smoke and vapors coming down the tube in the stem from the bowl pass up and through the inverted-U-shaped tube and the heavier particles and the moisture or vapors condensed in the metal tube $d$ descend by gravity through the reduced end of the said tube $d$ into the tubular reservoir or trap $e$ and are held therein by the saucer-shaped portion of the spring-cap $f$, the vapors alone passing through the openings 2 3 to the smoker.

The tube $d$ and reservoir $e$ are preferably of some light metal, such as aluminium, the spring-cap $f$ being preferably of thin spring brass or steel capable of maintaining its position. The said spring-cap is made with a slight projection or knob to the left-hand end, (see the plan view Fig. 6,) adapted to be engaged by the finger in pressing the spring-cap down and to one side, so as to remove the poisonous nicotin or other matter that has accumulated in the tubular reservoir or trap, after which the spring-cap is readily replaced.

If desired, the tube $d$ may be readily removed from the stem of the pipe for cleansing and the tubular reservoir $e$ unscrewed and removed for a like purpose. The opening in the stem from the bowl is accessible through the bowl, and the mouthpiece may be removed also for cleansing, so that all parts of the pipe are readily cleansed.

I prefer to provide the inverted-U-shaped tube $d$ with a valve 5, having a handle, so that the same can be turned by the fingers, because when this valve is closed it facilitates the operation of blowing through the mouthpiece to blow out of the reservoir any accumulation therein after the spring-cap $f$ has been pushed to one side, although the said valve is not absolutely necessary and I do not limit myself to its use. I also prefer to place in the base of the bowl a perforated plate 6, supporting the tobacco in the bowl and preventing the same finding access into the opening in the stem.

I claim as my invention—

1. In a tobacco-pipe, the combination with the stem, of an inverted removable U-shaped tube rising above the said stem with one end passing into the stem and forming a continuation of the opening therein and the other end passing through the stem and having an opening alining with the opening in the mouthpiece, and a tubular reservoir or trap forming a continuation at one end of the said tube and outside the stem and a cap for closing the orifice therein, substantially as set forth.

2. The combination in a tobacco-pipe with the stem, of a removable inverted-U-shaped tube tapering at one end and reduced at the other end and rising above the stem of the pipe with the tapering end passing into the stem adjacent to the bowl and orming a continuation of the opening in the stem and with the reduced end passing through the stem adjacent to the mouthpiece and having an opening in said reduced end, and a tubular reservoir or trap outside the stem and surrounding the reduced end of the said tube and screwing up into and through the said stem and having an opening alining with the opening in the said tube, and a spring-cap to cover the orifice in the said tubular reservoir, substantially as set forth.

3. The combination in a tobacco-pipe with the stem, of a removable inverted-U-shaped tube tapering at one end and reduced at the other end and rising above the stem of the pipe with the reduced end passing into the stem adjacent to the bowl and forming a continuation of the opening in the stem and with the reduced end passing through the stem adjacent to the mouthpiece and having an opening in said reduced end, a valve in the said inverted-U-shaped tube, a tubular reservoir or trap surrounding the reduced end of the said tube and screwing up into and through the said stem and having an opening alining with the opening in the said tube, and a spring-cap to cover the orifice in the said tubular reservoir, substantially as set forth.

4. A tobacco-pipe having the opening in the stem partially closed by a plug, a removable inverted-U-shaped tube of metal at one end passing through the stem beyond the said plug and at the other end reduced and passing into the stem beyond the opposite end of said plug, the said tube forming a continuation of the opening in the said stem and provided with a perforation adjacent to the opening in the mouthpiece and a tubular reservoir or trap formed as a continuation of the said tube and extending outside of and below the stem of the pipe and a spring-cap for closing the orifice in the said tubular reservoir or trap, substantially as set forth.

5. A tobacco-pipe having the opening in the stem partially closed by a plug, a removable inverted-U-shaped tube of metal at one end passing through the stem beyond the said plug and at the other end reduced and passing into the stem beyond the opposite end of said plug, the said tube forming a continuation of the opening in the said stem and provided with a perforation adjacent to the opening in the mouthpiece and a tubular reservoir or trap formed as a continuation of the said tube and extending outside of and terminating with a bell-shaped end below the stem of the pipe and a spring-cap having a saucer-shaped portion fitting against and for closing the orifice in the said tubular reservoir or trap, substantially as set forth.

Signed by me this 20th day of August, 1900.

WM. N. HARING.

Witnesses:
GEO. T. PINCKNEY,
BERTHA M. ALLEN.